United States Patent [19]

Trim et al.

[11] Patent Number: 5,251,510
[45] Date of Patent: Oct. 12, 1993

[54] RING GEAR FIXTURE AND MACHINING PROCESS THEREFOR

[75] Inventors: Neil R. Trim, Fort Wayne; Robert Cable, Auburn, both of Ind.

[73] Assignee: Dana Corporation, Toledo, Ohio

[21] Appl. No.: 760,938

[22] Filed: Sep. 17, 1991

[51] Int. Cl.[5] .......................... B23B 1/00; B23B 31/02
[52] U.S. Cl. .................................. 82/1.11; 279/133; 279/136; 408/1 R
[58] Field of Search ............... 279/136, 138, 133, 141, 279/123, 124; 82/1.11, 170; 409/62; 407/119; 408/1

[56] References Cited

U.S. PATENT DOCUMENTS

| | | | |
|---|---|---|---|
| 1,561,843 | 11/1925 | Garrison | 279/136 |
| 1,692,379 | 11/1928 | Kempton et al. | 279/136 |
| 1,701,448 | 2/1929 | Gallimore et al. | 279/133 |
| 1,812,006 | 6/1931 | Jellicoe | 279/141 X |
| 1,817,953 | 8/1931 | Stevens | 82/170 X |
| 2,153,829 | 4/1939 | Garrison | 279/1 |
| 2,443,895 | 6/1948 | Day et al. | 279/1 |
| 2,453,262 | 11/1948 | Peters | 279/2 |
| 2,463,156 | 3/1949 | Day | 279/1 |
| 2,511,954 | 6/1950 | Telfor et al. | 279/1 |
| 2,553,178 | 5/1951 | Day | 279/136 |
| 2,686,681 | 8/1954 | Nyland | 279/136 X |
| 2,714,514 | 8/1955 | Hohwart et al. | 279/1 |
| 2,821,400 | 1/1958 | Hohwart et al. | 279/1 |
| 2,839,307 | 6/1958 | Garrison et al. | 271/1 |
| 2,860,882 | 11/1958 | Whitney | 279/6 |
| 2,933,320 | 4/1960 | Lyons | 279/1 |
| 2,940,764 | 6/1960 | Krantz | 279/1 |
| 3,176,997 | 4/1965 | Parker et al. | 279/136 |
| 3,368,455 | 2/1968 | Ellwanger | 90/1 |
| 3,380,747 | 4/1968 | Hohwart et al. | 279/106 |
| 3,468,435 | 9/1969 | Ellwanger et al. | 214/1 |
| 3,651,954 | 3/1972 | Anthony | 214/1 Q |
| 3,735,994 | 5/1973 | Jaehn | 279/1 G |
| 4,483,105 | 11/1984 | Bender | 51/227 |
| 4,552,491 | 11/1985 | Parker . | |
| 4,754,543 | 7/1988 | Spivy | 29/557 |

FOREIGN PATENT DOCUMENTS

| | | | |
|---|---|---|---|
| 5706 | 1/1989 | Japan | 279/1 G |
| 45501 | 2/1989 | Japan | 82/170 |
| 1506470 | 5/1976 | U.S.S.R. | 409/62 |
| 529011 | 9/1976 | U.S.S.R. | 82/170 |
| 1348074 | 10/1987 | U.S.S.R. | 279/1 G |

*Primary Examiner*—Z. R. Bilinsky
*Attorney, Agent, or Firm*—R. William Graham

[57] ABSTRACT

The present invention relates to a fixture and method for positioning and holding a gear to be machined, as for example in a ring and pinion gear set for vehicle axles. The fixture includes a base, a clamp and a locator. The base has a surface against which the gear is to be held and a bore which extends into the base from the surface of the base. The clamp is connected to the base. The locator is movably disposed in the bore of the base such that the locator is moveable between a first position wherein an end of the locator extends above the surface of the base for positioning the ring gear by aligning with a surface which defines a bore of the gear so that the clamp can be positioned to hold the ring gear and a second position to which the locator is retracted below the surface of the base so that the ring gear can be machined without interference by the locator.

4 Claims, 2 Drawing Sheets

RING GEAR FIXTURE AND MACHINING PROCESS THEREFOR

The present invention relates to a device for positioning and holding a work piece to be machined. More particularly, the invention relates to a fixture for positioning and holding gears and a process for machining such gears.

Many types of fixtures exist for centering and holding gears which are to be machined, such as ring gears for a ring and pinion gear set for vehicle axles. Presently, ring gear fixtures utilize pin plates for positioning each gear to be machined, with the pins of a pin plate oriented to properly position a particular gear having a particular gear ratio. Machining a number of gears having different gear ratios requires a corresponding number of pin plates to be kept on hand. Conventional fixtures require special tools to attach and remove the pin plates and/or prepare the fixture for receiving the desired gear ratio. It becomes burdensome to the operator to constantly change the pin plates. The pin plates require preparation prior to commencing machining operations. The use of coolants is required to control heat transfer to the pin plates and piece part which would otherwise overheat and be damaged during the machining process. These factors increase the time and cost of the machining process.

While some fixtures exist which utilize a centering piece for aligning with a surface defining a bore in the gear, such fixtures impair full machining of the bore itself. For example, an expanding collet chuck exists which is adapted to center and clamp to an inner diameter portion of a gear. Because of the presence of the collet in the gear inner diameter, the bore of the gear cannot be fully machined without removal of the collet.

There remains a need for a fixture which can readily center and hold in a relatively accurate manner a gear to be machined and which provides access to the bore of the gear for machining with minimal interference by the fixture, despite the use of the gear inner diameter as the fixture locating device.

SUMMARY OF THE INVENTION

The present invention is directed to a fixture which provides relatively easy and accurate positioning and holding of a ring gear and a process for machining such gear. The fixture comprises a base, a clamp and locator. The base has a surface against which the gear is to be held and a generally cylindrical bore which extends into the base from the surface of the base. The clamp is connected to the base. The locator is generally cylindrical and movably disposed in the bore of the base such that the locator is moveable between a first position wherein an end of the locator extends above the surface of the base for positioning the ring gear by aligning with a surface which defines a bore of the gear so that the clamp can be positioned to hold the ring gear and a second position to which the locator is retracted below the surface of the base so that the ring gear can be machined without interference by the locator.

Also provided is a method for machining a ring gear. The method comprises the steps of placing the ring gear on a surface of a machining fixture, the fixture having a locator movably disposed therein which is movable between a first position above the surface of the fixture and a second position below the surface of the fixture, extending the locator to the first position such that a portion of the locator contacts a surface of the ring gear defining a bore of the ring gear to position the ring gear on the fixture, clamping the ring gear to retain the ring gear in position during machining, retracting the locator to the second position so that the bore of the ring gear can be machined without interference by the locator, and machining by hard turning the hardened ring gear without coolants.

DETAILED DESCRIPTION OF THE INVENTION

Figure 1:
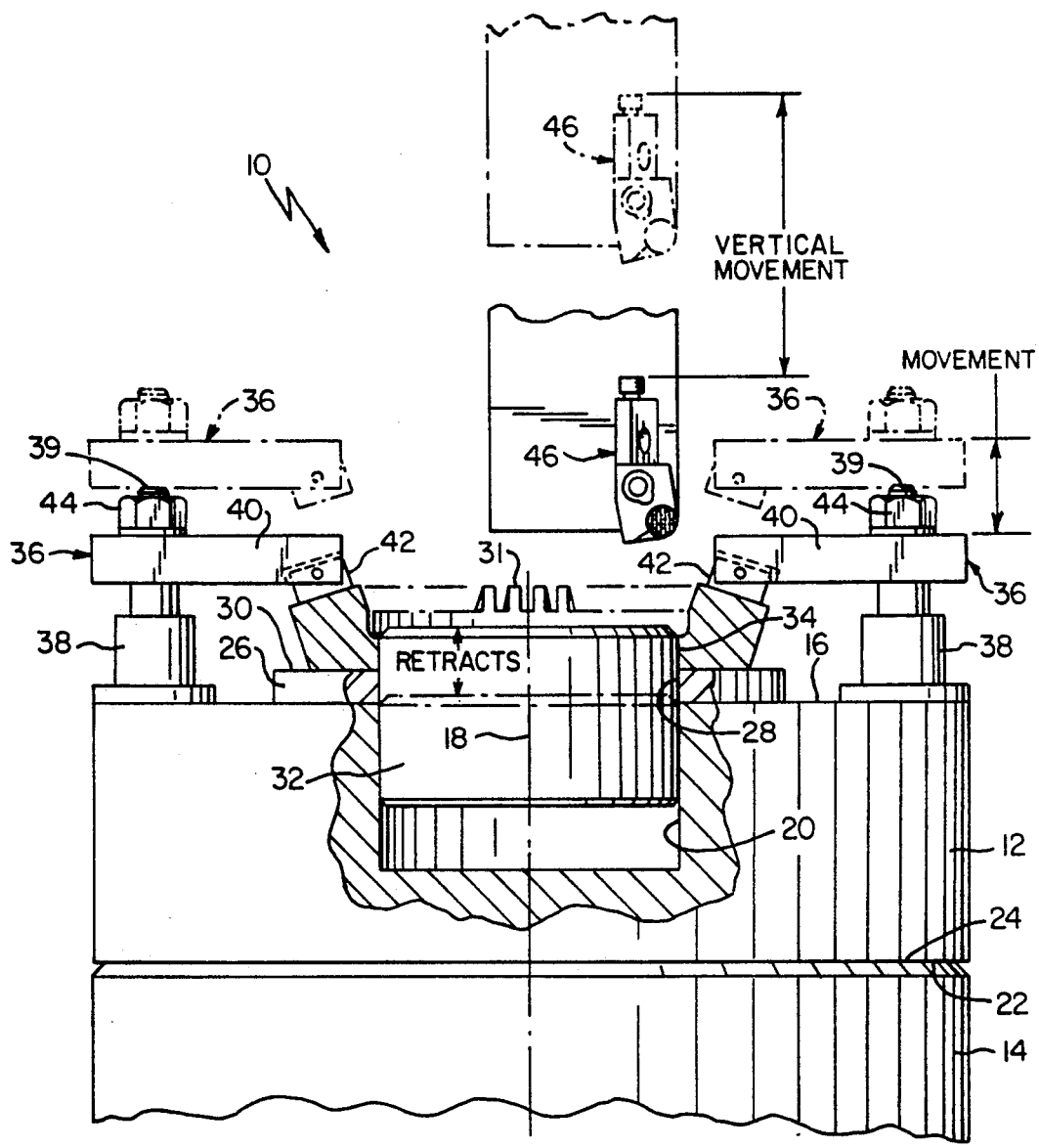
FIG. 1 is a section through the fixture and a gear.

Referring to FIG. 1, the fixture 10 according to the invention herein includes a base 12 adapted to be readily fixed to a desired machine spindle 14, such as a KASPER ® twin spindle machine or a KASPER ® single spindle. Base 12 has a surface 16 and a central axis 18. A generally cylindrical bore 20 extends from surface 16 into base 12 coaxial with the central axis 18. Base 12 has a shoulder portion 22 for seating upon a front face 24 of spindle 14.

A generally disc-shaped face plate 26 has a generally cylindrical bore 28 which is substantially the same in diameter as bore 20. Base 12 includes face plate 26 and is connected to surface 16 such that bore 28 and bore 20 are coaxial. Face plate 26 has surface 30 which acts as a seat for the back face of a ring gear 31, such as a hypoid ring gear, so that the teeth of the gear face outwardly from plate 26. Alternatively, face plate 26 need not be used and ring gear 31 can be directly seated to surface 16.

Locator 32 is generally cylindrical and is movably disposed within bore 20. Locator 32 includes a frustoconical end portion 34 shaped to conform to a surface which defines a bore of the ring gear 31 for centering the gear 31. While hundreds of different gear ratios exist in the industry, there are relatively fewer inner diameter sizes for gear 31. End portion 34 can be designed to accommodate several inner diameter sizes. Alternatively, several locators can be made up having different frustoconical end configurations which can be interchangeably placed in fixture 10. It is contemplated that other shaped end configurations can exist for positioning a particular work piece on the fixture.

Locator 32 is movable between a first position (not shown) above surface 30 of plate 26 and a second position below surface 16 of base 12. Movement of locator 32 is preferably done through the use of a hydraulic system, for example.

While locator 32 is in the first position, gear 31 is placed on locator so that gear 31 can be positioned, and in the preferred embodiment centered. Alternatively, the gear 31 can be movably held on the surface 30 and locator 32 raised into the first position such that the end portion 34 contacts with a surface defining the bore of the gear 31 to bring gear 31 into position.

A plurality of clamps 36 are spaced about face plate 26 at a predetermined distance to enable the gear 31 to be placed on face plate 26. Clamps 36 include base portion 38 connected to base 12 on, for example, surface 16. A bolt 39 extends outwardly from the base portion 39 and an arm 40 is pivotally connected to bolt 39. Work holding block 42 is pivotally connected to arm 40 and is adapted to engage an outer perimeter portion of gear 31. Nut 44 holds arm 40 and bolt 39 in a predetermined position. Clamps 36 are preferably operated by a hydraulic system.

Once the gear 31 has been placed on face plate 26 and centered with locator 32, clamps 36 are pivoted so that blocks 42 are positioned on the outer perimeter portions of gear 31. Clamps 36 are then tightened so that blocks 42 engage the outer perimeter portion or toothed portion, of gear 31 to retain gear 31 in the desired position during the machining process. At this point, locator 32 is moved to the second position so that the bore of the gear 31 can be suitably machined.

Figure 2:
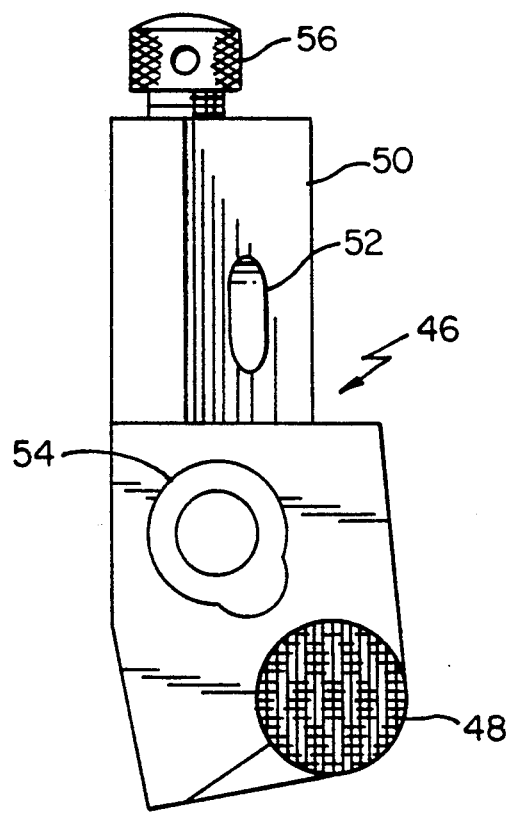
FIG. 2 is a side view of the cutting tool appearing in FIG. 1.

Cartridge assembly 46, see FIG. 2, is a tool for cutting the bore of gear 31 by rotation about central axis 18. Cartridge assembly 46 includes a round ceramic insert 48 which is the cutting part of the cartridge assembly 46 and also can be made of a carbide material, (silicon carbide) for example. Body portion 50 of cartridge assembly 46 is made to fit to a boring bar which in turn fits to a vertical tool slide (not shown). In connection with this, threaded orifice 52 allows mounting screw (not shown) to hold cartridge assembly 46 in place on the boring bar. Insert clamp 54 holds insert 48 in the desired position. Adjustment screw 56 is provided for axially adjusting cartridge assembly 46.

The present invention can be used for rough or finish machining gear 31. Fixture 10 enables the bore of gear 31 to be machined, wherein a carbide insert is used for roughing a soft gear and a ceramic insert is used for finishing hard gears.

Ring gears are typically heat treated prior to cutting the bore of the gear. Conventionally, this required a grinding process. The present invention through the use of cartridge assembly's 46 ceramic insert 48 in conjunction with fixture 10 replaces and substitutes grinding operations.

Another aspect of the present invention resides in the centering of the gear 31 through the alignment of the surface defining the bore of gear 31 with locator 32. This is advantageous because gear 31 is typically also centered about the bore of gear 31 for machining of gear 31. The centering of gear 31 on a common point increases quality of the products by keeping constant one of the factors in the machining process.

Thus, the present invention provides a fixture for positioning and holding a ring gear and a machining process using the same which substantially reduces set-up and down time and reduces tool costs while increasing quality. The present invention has been set forth in a specific embodiment, however, it is not meant to limit the scope or nature of the invention. It will be readily apparent to one skilled in the art that many modifications, derivations and improvements can be made from the invention herein, and that the present invention is intended to cover any such variations thereof.

What is claimed is:

1. A method for machining a ring gear having a body including a toothed front face, a rear face, and a central bore coaxial with the axis of rotation of the gear, the central bore to be machined over a substantial portion of its axial depth, requiring clearance in a machining fixture greater than the axial depth of the gear, comprising the steps of:
    placing the ring gear with the rear face against a mounting surface of a machining fixture which has a central locator movably disposed therein, the locator movable between a first position above the surface of said fixture and a second position below the surface of said fixture;
    extending said locator to said first position such that a portion of said locator contacts the central bore of the ring gear to position the ring gear;
    clamping against a portion of the toothed front face of the ring gear to hold the ring gear in place against said machining fixture during machining;
    retracting said locator to said second position;
    gradually inserting a cutting tool cartridge assembly into the central bore of the ring gear to a depth greater than the axial depth of the ring gear to permit the cutting portion of said assembly to contact and interact with the complete bore surface along its entire axial depth without said assembly contacting said fixture at any time; and
    machining the central bore surface of the ring gear.

2. The method of claim 1, wherein the step of machining the ring gear is further characterized to be machining the bore of the ring gear using a ceramic cutting tool without the need for lubricants or coolants.

3. A fixture for positioning and holding a ring gear having a body including a toothed front face, a rear face, and a central bore coincident with the axis of rotation of the gear, the central bore to be machined over a substantial portion of its axial depth, requiring clearance in said fixture to a depth greater than the axial depth of the gear, comprising:
    a base having a surface against which the rear face of the gear is positioned and a generally cylindrical bore extending into said base from said surface of said base;
    means connected to said base for clamping the ring gear which includes means for fixably interacting with the toothed front face of the gear to maintain the gear in position, wherein said clamping means includes a base portion connected to said base of said fixture, an arm pivotally connected to said base portion and wherein said fixably interacting means is a work holding block pivotally connected to said arm, said work holding block engaging and seating between an adjacent pair of teeth of the gear; and
    a generally cylindrical locator movably disposed in said cylindrical bore of said fixture such that said locator is movable between a first position wherein an end of said locator extends above said surface of said base for positioning the gear by aligning the bore of the gear with respect to said fixture so that said clamping means can be positioned and tightened to hold the gear in place against said base, and a said second position below said surface of said base so that the gear can be machined without interference by said locator.

4. A fixture for centering and holding a ring gear having a body including a toothed front face, a rear face, and a central bore coaxial with the axis of rotation of the gear, the central bore to be machined over a substantial portion of its axial depth, requiring clearance in said fixture greater than the axial depth of the gear, comprising:
    a base having a central axis and a generally cylindrical bore, coaxial with said central axis, extending into said base from said surface;
    a work plate, against which the ring gear is positioned, connected to said surface of said base and having a generally cylindrical bore therethrough coaxial with said bore of said base;

a plurality of articulated clamps connected to said surface of said base and of a predetermined spacing from said work plate, each of said clamps includes a base portion connected to said base of said fixture, an arm pivotally connected to said base portion of each said clamp and a work holding block pivotally connected to each said arm which fixably interact with a toothed portion of the ring gear; and a generally cylindrical locator adapted to move through said bore of said base and said bore of said work plate between a first position, wherein an end of said locator extends above said work plate for centering the ring gear by aligning with a surface which defines the bore of the ring gear so that the ring gear is properly positioned and said clamps can be positioned and tightened against the ring gear such that each said block engages and seats between an adjacent pair of teeth, and a second position wherein said locator is retracted below said work plate so that the ring gear can be machined without interference by the locator.

* * * * *